United States Patent [19]
Miyamoto

[11] 3,950,781
[45] Apr. 13, 1976

[54] HUE CONTROL CIRCUIT

[75] Inventor: Seiji Miyamoto, Osaka, Japan

[73] Assignee: Sanyo Electric Co., Ltd., Moriguchi, Japan

[22] Filed: Sept. 18, 1974

[21] Appl. No.: 506,999

[30] Foreign Application Priority Data
Sept. 18, 1973 Japan............ 48-109033[U]
July 10, 1974 Japan............ 49-82140[U]

[52] U.S. Cl. ............................... 358/28
[51] Int. Cl.² ............................. H04N 9/535
[58] Field of Search ........................ 358/28

[56] References Cited
UNITED STATES PATENTS

| | | | |
|---|---|---|---|
| 2,888,514 | 5/1959 | Pritchard | 358/28 |
| 3,662,097 | 5/1972 | Rennick | 358/28 |
| 3,663,744 | 5/1972 | Harwood | 358/28 |
| 3,708,613 | 1/1973 | Nakabe et al. | 358/28 |
| 3,729,578 | 4/1973 | Slusarski | 358/28 |
| 3,749,825 | 7/1973 | Moore | 358/28 |
| 3,783,186 | 1/1974 | Slavik et al. | 358/28 |
| 3,852,807 | 12/1974 | Caprio et al. | 358/28 |

OTHER PUBLICATIONS

Ekstrand, "A Flesh-tone Correction Circuit", *IEEE Trans. Broadcast & Television Receivers (USA)*, Vol. BTR-17, No. 3 (Aug. 1971) pp. 182–189.

*Primary Examiner*—Robert L. Richardson
*Attorney, Agent, or Firm*—Armstrong, Nikaido & Wegner

[57] ABSTRACT

A hue control circuit for use in a color television system to reproduce a normal flesh tone, which comprises means for reducing the Q component of a color signal in response to at least a (R-Y) color difference signal.

2 Claims, 11 Drawing Figures

HUE CONTROL CIRCUIT

BACKGROUND OF THE INVENTION

1. Field of the Invention

The present invention relates to a hue control circuit for use in a color television receiver and, more particularly, to a hue control circuit for reproducing a flesh tone and other colors faithfully.

2. Description of the Prior Art

It is well known that human eyes are most sensitive to a flesh tone and, therefore, when a chrominance signal of a flesh tone, which is distorted in a transmission path or in a color TV receiver, is reproduced through a color TV receiver, a viewer senses a reproduced hue as a unnatural hue as compared with a normal flesh tone even if the distortion is slight.

To avoid such problem, an ACCU-TINT method has been proposed.

This method teaches to reduce the Q component of color signal in a color television system, wherein the Q component is designated by an axis perpendicular to the I axis which coincides near a flesh tone. According to the method, for example, a red which is represented by a vector R shown in FIG. 1 moves to the I axis by reducing the Q component of the R vector the resultant vector can be represented by R'. Therefore, a color signal near the I axis is drawn to the I axis, so that flesh tone can be reproduced faithfully.

However, this ACCU-TINT method has a disadvantage that hue and saturation of colors of magenta Mg, blue B, cyan Cy and green G are unnecessarily distorted as shown by Mg', B', Cy' and G' by decreasing respective Q components of these colors. This distortion of the colors appears strongly on the color near the Q axis so that, particularly, a green becomes bluish whereby a green leaf is reproduced in abnormal tone.

To remove the disadvantage, such system as to inhibit operation of reduction of Q component in response to (G−Y) signal, when a green signal is applied to a color demodulator may be proposed.

However, this system still has a disadvantage that because a switching level for designating whether the Q component should be reduced or not is set on a level represented by a line S as shown in FIG. 2, when a light green of which vector is shown by G' is reproduced, the Q component of the G'' is decreased and, consequently, the light green become bluish. On the other hand, when the switching level is set as shown S' in FIG. 3, the Q component of the light green can be maintained as a original value so that the light green can be reproduced in normal color. However, in this case, the range where color compensation for reproducing a normal flesh tone can be performed by decreasing the Q component of a color signal will be narrowed to a value as shown by D in FIG. 3 and, consequently, desirable flesh tone may not be reproduced.

SUMMARY OF THE INVENTION

Accordingly, an essential object of the present invention is to provide a hue control circuit which can reproduce faithfully not only a normal flesh tone, but also other colors, substantially eliminating such disadvantages as hereinabove described.

Another object of the present invention is to provide a hue control circuit for reproducing a normal flesh tone, which comprises a control circuit for reducing an undesired Q component of a color signal in response to a (R−Y) color difference signal, so that cyan, green and light green can also be reproduced faithfully.

A further object of the present invention is to provide a hue control circuit for reproducing a normal flesh tone, which comprises a control circuit for reducing an undesired Q component of a color signal in response to −(B−Y) and (R−Y) color difference signal so that magenta, cyan, green and light green can also be reproduced faithfully. The present invention is directed to a hue control circuit for use in a color television system to reproduce a normal flesh tone. The circuit includes means for reducing the Q component of a color signal, which comprises a sub-carrier oscillator, a (B−Y) demodulator for deriving a (B−Y) color difference signal from a carrier chrominance signal in accordance with the (B−Y) sub-carrier and a (R−Y) demodulator for deriving an (R−Y) color difference signal from a carrier chrominance signal in accordance with the (R−Y) sub-carrier. A matrix circuit is provided for receiving the output of the demodulator circuits and deriving (B−Y), (R−Y) and (G−Y) signals therefrom. A phase shifting circuit is coupled between the sub-carrier oscillator and both of the demodulators, the phase shifting circuit being controlled by the (R−Y) alone, or the (R−Y) and (B−Y) output signals from the matrix circuit. The phase shifting circuit causes a decrease in the Q component when the (R−Y) output signal is positive or when the (R−Y) output signal is positive and the (B−Y) output signal is negative by making the phase difference between the demodulation axes greater than 90°. The decrease in the Q component provides compensation to correct errors in flesh tone signals. However, when the (R−Y) signal is negative, the Q component is not decreased, thereby eliminating compensation or colors other than flesh tones.

BRIEF DESCRIPTION OF THE DRAWINGS

The present invention will hereinafter be described in conjunction with preferred embodiments with reference to the attached drawings, in which.

DETAILED DESCRIPTION OF THE PREFERRED EMBODIMENTS

Figure 1:
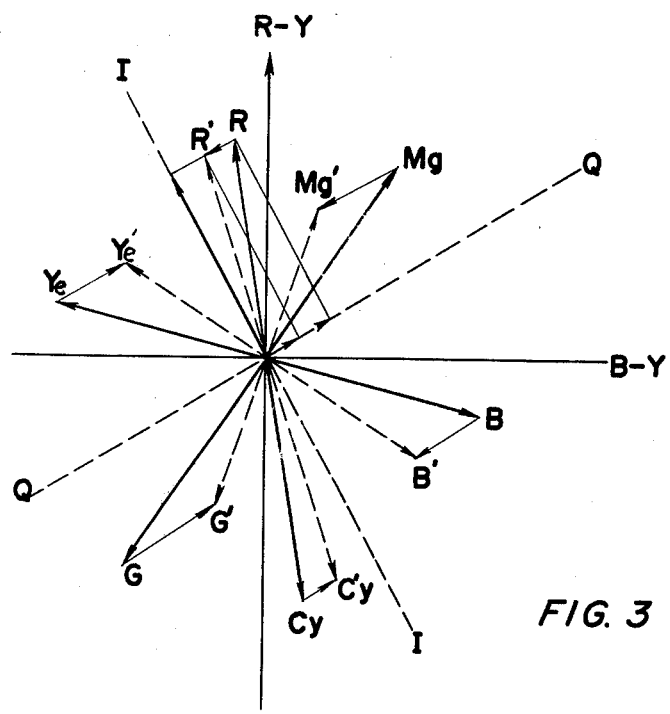
FIG. 1 is a color vector diagram for explaining a conventional method for reproducing a flesh tone.
Figure 2:
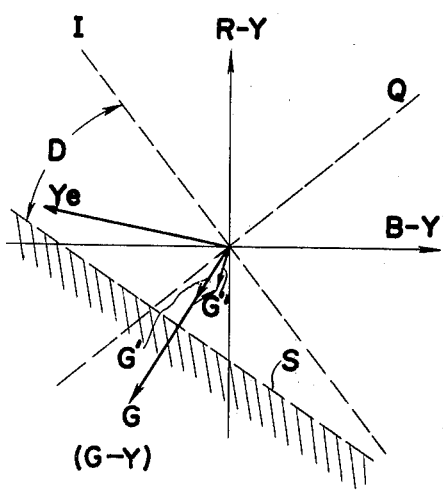
FIGS. 2 and 3 are color vector diagrams to explain an operation of another method for reproducing flesh tone.
Figure 3:
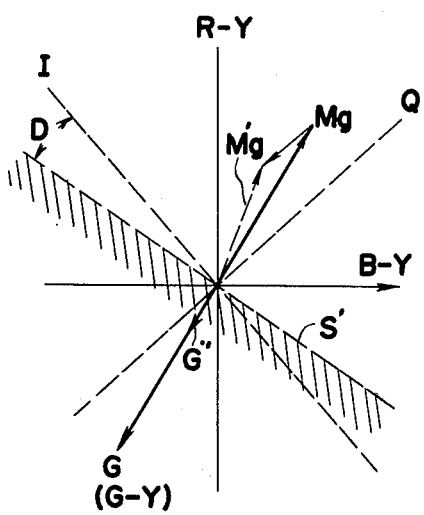

Before the description of this invention proceeds, it is noted that in respective embodiments hereinafter described, like reference numerals are employed to designate like portions.

Figure 4:
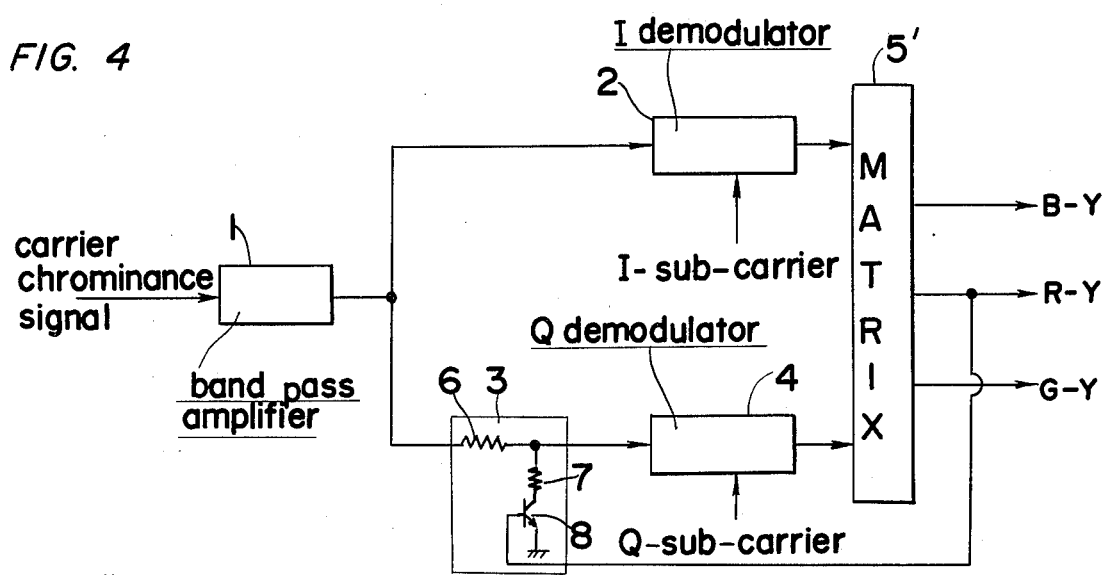
FIG. 4 is a circuit diagram showing a first embodiment of the present invention.

Referring to FIG. 4, wherein related circuit components of a color television receiver are shown in block diagram, a carrier chrominance signal received by the color television receiver is amplified in a band pass amplifier 1. The output carrier chrominance signal of the band pass amplifier 1 is fed to an I axis demodulator 2, to which demodulator 2 I sub-carrier having a phase coinciding with the I axis is applied, so that I component of the chrominance signal can be demodulated.

On the other hand, the output signal of the band pass amplifier 1 is also applied to a gain control circuit 3 of which gain varies in response to an R−Y color signal in such a manner as hereinafter described.

The output signal of the gain control circuit 3 is applied to a Q demodulator 4, to which demodulator 4 Q sub-carrier having a phase coinciding with the Q axis is applied so that a Q component of chrominance signal is demodulated.

Both outputs from the respective I demodulator 2 and Q demodulator 4 are applied to a circuit 5' which produces B−Y, R−Y, and G−Y signals according to respective values of the I and Q signals.

The gain control circuit 3 is, in the illustrated embodiment, composed of resistors 6 and 7 and transistor 8. The resistor 6 is inserted between the output terminal of the band pass amplifier 1 and the input terminal of the Q demodulator 4.

One terminal of the resistor 7 is connected to the output terminal of the resistor 6 and another terminal of the resistor 7 is grounded through the collector and emitter of the transistor 8 the base of which transistor 8 receives +(R−Y) output signal from the circuit 5'.

However, it is noted that positive and negative color difference signals appearing on the respective (B−Y) and (R−Y) output terminals of the circuit 5' are hereinafter designated as ±(B−Y) and ±(R−Y) signals.

Respective values of the resistors 6 and 7 are equal to each other so that output voltage of the gain control circuit 3 is divided into one half of the output voltage of the band pass amplifier 1 when the transistor 8 is conducted in response to the application of the +(R−Y) signal.

The switching level of the transistor 8 is determined by a line E in which the conductivity of the transistor 8 increases gradually near the zero volt of the (R−Y) signal so as to prevent a sudden change of hue.

Assuming that a carrier chrominance signal $Y_e''$ corresponding to yellow, which has been amplified by the band pass amplifier 1, is applied to the I axis demodulator 2, the chrominance signal $Y_e''$ is demodulated on the basis of the I axis.

Figure 5:
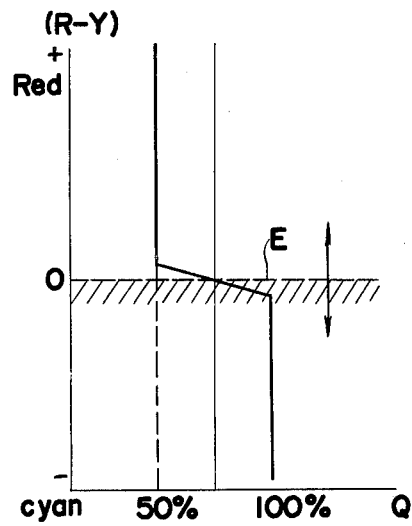
FIG. 5 is a diagram showing a switching operation of a gain control circuit employed in the first embodiment.

On the other hand the carrier chrominance signal $Y_e''$ is also applied to the Q demodulator 4. Outputs of the I and Q demodulators 2 and 4 are individually applied to the circuit 5' which in turn produces +(R−Y) component and −(B−Y) component. This +(R−Y) component is applied to the base of the transistor 8, causing the transistor 8 to conduct. Therefore, the input voltage applied to the gain control circuit 3 is divided by the resistors 6 and 7, and the output voltage of the gain control circuit 3 becomes about 50% of the input voltage as shown in FIG. 5. Thus, the output voltage of the Q demodulator is reduced, so that the demodulated Q component is also reduced by 50%. As a result, a color vector Y'' composed by I and Q demodulated signal moves right and approaches to the I axis as shown by $Y_e''$ in FIG. 6.

From the foregoing, it is understood that even if a carrier chrominance signal of flesh tone shifted from the normal vector position of the flesh tone by any distortion, is applied to the band pass amplifier 1, the composite vector of the demodulated color signal being obtainable at the output of the I and Q demodulators 2 and 4, or the output of the matrix circuit, is drawn to the I axis, so that normal flesh tone can be reproduced.

A similar operation can be performed, when a carrier chrominance signal of red R is applied to the I and Q demodulators 2 and 4. In this case a vector R moves to left and approaches to the I axis.

Figure 6:
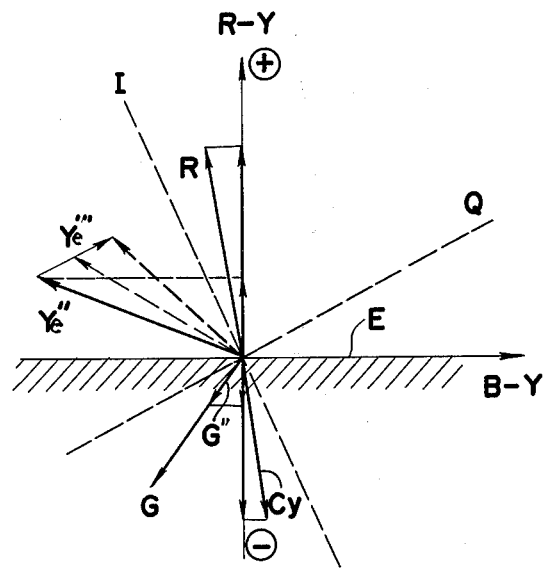
FIG. 6 is a vector diagram showing the operation of the first embodiment.

On the other hand, when a carrier chrominance signal, of light green of which a color vector is represented by G'' in the FIG. 6 is applied to the band pass amplifier 1, the carrier chrominance signal is applied in part to the I demodulator 2 and in part to the Q demodulator 4 through the gain control circuit 3. In this case, the circuit 5' does not produce +(R−Y) signal. Then, the transistor 8 becomes nonconductive, so that the output voltage of the band pass amplifier 1 is applied directly to the Q demodulator 4. Therefore, the Q component of the vector G'' is not reduced, whereby normal light green color can be reproduced.

Although the gain control circuit 3 has been described as inserted between the amplifier 1 and the demodulator 4, it may be inserted between the demodulator 4 and the circuit 5'.

Figure 7:
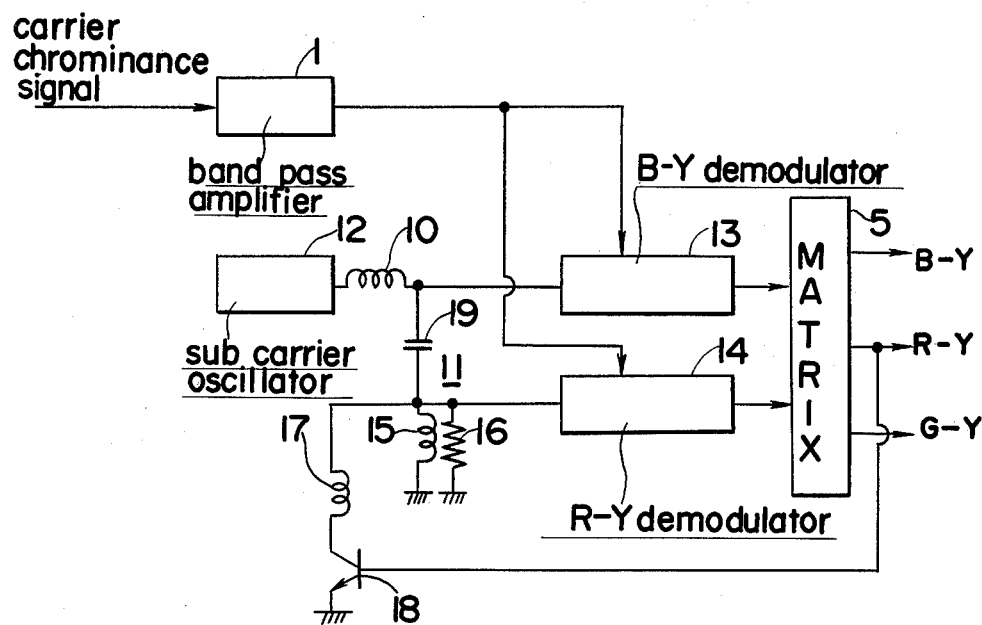
FIG. 7 is a circuit diagram of a second embodiment of the present invention.

FIG. 7 shows a second embodiment of the present invention, which is applied to a (R−Y) and (B−Y) axis demodulating system.

Referring to FIG. 7, there is provided a first coil 10 of a phase shifting circuit 11 between a sub-carrier oscillator 12 and a (B−Y) demodulator 13. The (B−Y) demodulator 13 is fed with carrier chrominance signal from the band pass amplifier 1.

A capacitor 19 is bridged between an output terminal of the coil 10 and an input terminal of a (R−Y) demodulator 14. A parallel circuit composed of a second coil 15 and a resistor 16 is connected between a junction, which is between the capacitor 19 and the (R−Y) demodulator 14, and the ground and a third coil 17 is grounded through an emitter-grounded, switching transistor 18. The base of the transistor 18 receives +(R−Y) signal from the circuit 5 which produces a (G−Y) signal from (R−Y) and (B−Y) input signals and has three outputs for the three signals.

The (R−Y) demodulator 14 receives the carrier chrominance signal from the band pass amplifier 1.

The phase shift circuit 11 operates so as to produces a sub-carrier, of which phase coincides with (B−Y) axis, at the output terminal of coil 10 and another sub-carrier, of which phase coincides with R−Y axis advanced 90° relative to the B−Y axis, at the output terminal of the capacitor 19.

Figure 8:
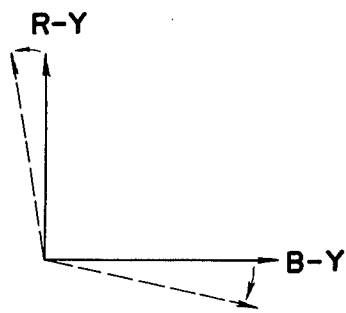
FIG. 8 is a vector diagram showing an operation of the second embodiment.

However, where a circuit between the oscillator 12 to the ground through the coil 17 completes by conduction of the transistor 18, the phases of the (B−Y) sub-carrier becomes retarded relative to the (B−Y) axis and also the phase of the (R−Y) sub-carrier become advance relative to the (R−Y) axis as shown in FIG. 8.

Assuming that a carrier chrominance signal of yellow of which vector is represented by $Y_e''$ as shown in FIG. 6 is applied to the (B−Y) and (R−Y) demodulators 13 and 14 from the band pass amplifier 1, a +(R−Y) color difference signal can be produced from the matrix circuit 5 in the well known manner. This +(R−Y) signal is applied to the transistor 18, thereby causing the transistor 18 to be conductive and the coil 17 is added to the coil 15. As a result, the phase difference between the (B—Y) and (R—Y) sub-carriers appearing on the input terminals of the (B—Y) and (R—Y) demodulators 13 and 14 become greater than 90°.

Figure 9:
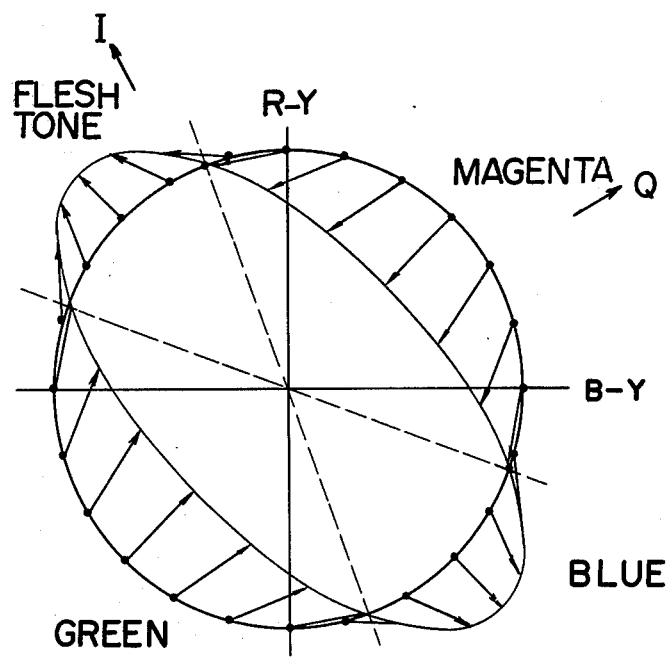
FIG. 9 is a vector diagram showing the principle of operation of the second embodiment.

However, it is noted that the following principle is known:

Carrier chrominance signals of various color, of which vector locus of respective colors is represented by a circle as shown in FIG. 9, are demodulated by (B—Y) and (R—Y) demodulators to which sub-carriers, displaced in phase more than 90° angles relative to each other, are applied respectively, vector locus representing the demodulated color signals being obtained through the respective demodulators becomes representing an oval slightly extending in the direction of the I axis as shown in FIG. 9.

This means that the Q component of the demodulated signal decreases slightly as compared with demodulated color signals which are respectively demodulated by the (B—Y) and (R—Y) demodulators to which normal sub-carriers, of which phases coincide with the (B—Y) and (R—Y) axis respectively, are applied.

From the foregoing, it is understood that the Q component of the composed color signals being obtained at the respective outputs of the (B—Y) and (R—Y) demodulators 13 and 14 decreases thereby causing the composite vector $Y_e''$ to move close to the I axis as shown $Y_e''''$ in the FIG. 6. Accordingly, a color signal near the I axis can be reproduced as normal flesh tone in a smilar manner as described in the description of the embodiment of the FIG. 4.

A similar operation as hereinbefore described can be performed in reproducing such colors as orange, red, or purple, of which color vectors exist in the first and second quadrant of a color co-ordinate which is designated by the (B—Y) and (R—Y) axis.

It is noted that the first quadrant means a quandrant existing between the +(B—Y) axis and the +(R—Y) axis, and the second, third and fourth quadrants are respectively designated by quadrants between the +(R—Y) and the —(B—Y), between the —(B—Y) and the —(R—Y), and between the —(R—Y) and the +(B—Y) axis.

In this embodiment, more correct normal flesh tone can be advantageously reproduced when input voltage of the B—Y demodulator 13 or output voltage thereof is decreased.

When a carrier chrominance signal of which color vector is in the range of third or fourth quadrant, for example, green is demodulated in the (B—Y) and (R—Y) demodulators 13 and 14 and applied to the matrix circuit 5, the output of the (R—Y) terminal becomes negative. This —(R—Y) signal is applied to the transistor 18, causing the transistor 18 to be non-conductive. Therefore, the coil 17 removed from the phase shift circuit 11 and the respective phases of the (B—Y) and (R—Y) sub-carriers coincide with the B—Y and R—Y axis. Under such condition, the carrier chrominance signal is demodulated without any modification, so that the green can be faithfully reproduced even if the color is light green.

Figure 10:
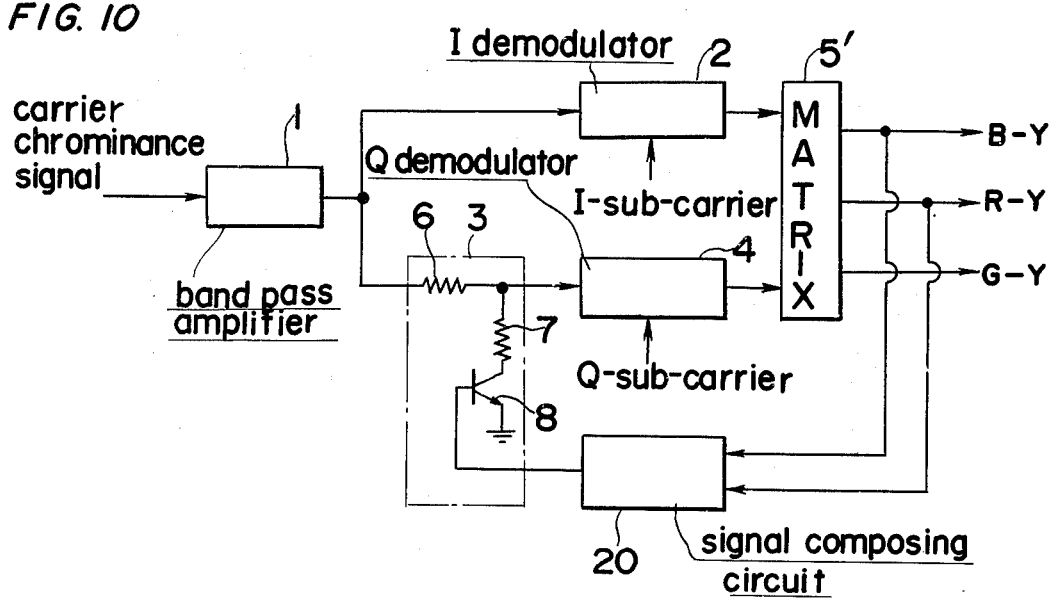
FIG. 10 is a circuit diagram showing a third embodiment of the present invention.

FIG. 10 shows a third embodiment of the present invention.

Referring to FIG. 10, there is provided a signal composing circuit 20 between the output terminals of the circuit 5' and the gain control circuit 3. The signal composing circuit receives both —(B—Y) and +(R—Y) signals fed from the circuit 5' and operates so as to produce an output signal only when both —(B—Y) signal and +(R—Y) signal are simultaneously applied to the input terminals of the signal composing circuit 20. The output signal of the signal composing circuit 20 is applied to the base of the transistor 8. In operation, when a carrier chrominance signal of which color vector exists in the range of the second quadrant, for exaple, yellow is demodulated in the I and Q demodulators 2 and 4 and then applied to the circuit 5', the circut 5 produces —(B—Y) and (R—Y) signals. These —(B—Y) and (R—Y) signals are fed to the signal composing circuit 20, which produces the output signal to the base of the transistor 8, causing the transistor 8 to be conductive. Therefore, the output value of the gain control circuit 3 reduces to one half of the normal value. Thus, the output value of the Q component of the color signal obtained at the Q demodulator 4 or the matrix circuit 5 decreases, whereby the color vector moves close to the I axis. Accordingly, color distortion is effectively corrected and normal flesh tone can be reproduced.

When a carrier chrominance signal of which color vector exists in the range of the first, third or fourth quadrants, such as magenta, blue, cyan or green, is demodulated, the circuit 5' can not produce one of —(B—Y) and (R—Y) signals or produces neither —(B—Y) nor (R—Y) signals, thus the transistor 8 is non-conductive. Therefore, the carrier chrominance signal is applied to the Q demodulator 4 directly, so that these colors are reproduced faithfully.

Figure 11:
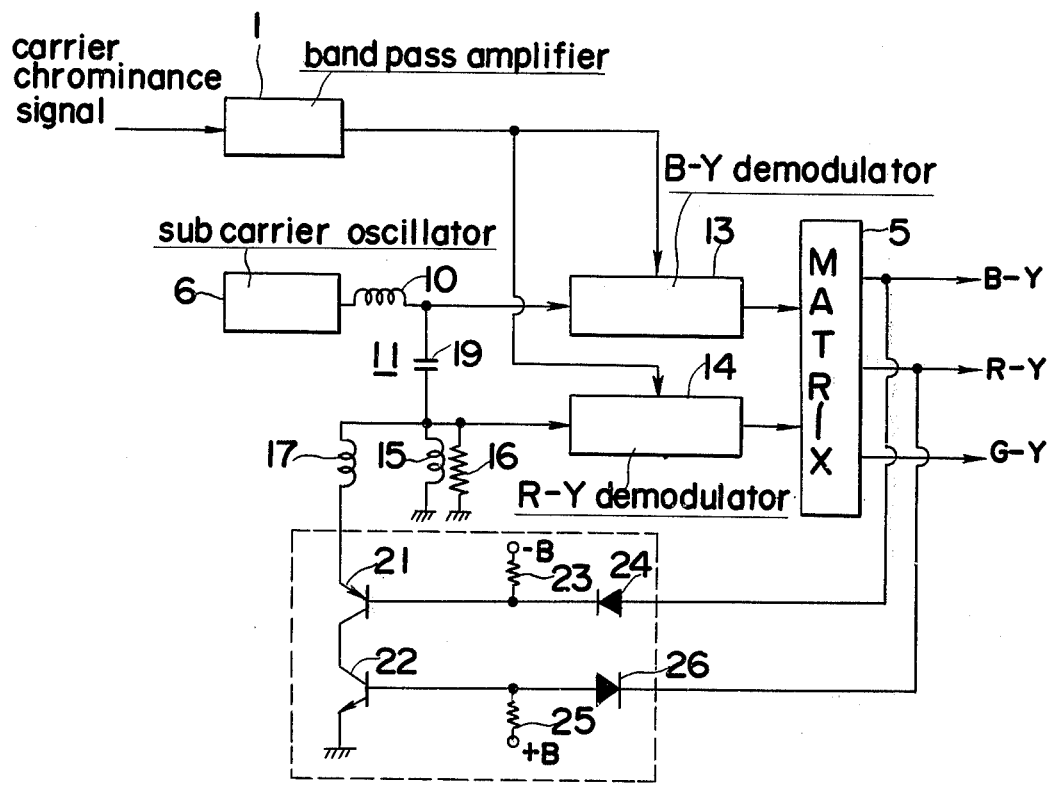
FIG. 11 is a circuit diagram showing a fourth embodiment of the present invention.

FIG. 11 shows a fourth embodiment of the present invention. In the embodiment of the FIG. 11, the coil 17 is grounded through two transistors 21 and 22 which are connected in series. The base of the transistor 21 is connected to a negative source —B through a resistor 23 to a cathode of a diode 24 of which anode is connected to the B—Y output terminal of the matrix circuit 5. The base of the transistor 22 is connected to a positive source +B through a resistor 25 and to an anode of a diode 26 of which cathode is connected to the (R—Y) output terminal of the matrix circuit 5.

In operation, when a carrier chrominance signal of a color existing in the range of the second quadrant is demodulated, the matrix circuit 5 produces —(B—Y) signal and +(R—Y) signal. The —(B—Y) signal is applied to the diode 24, which is non-conductive, and the negative voltage is then applied to the base of the transistor 21 thereby switching the latter on. The +(R—Y) signal is applied to the diode 26, which is turned off, and the positive voltage is then applied to the base of the transistor 22, thereby switching the latter on. Therefore, the coil 17 is grounded. Under the such condition, the phase difference between these (B—Y) and (R—Y) carriers fed to the (B—Y) and (R—Y) demodulators 13 and 14 becomes larger than 90° as hereinbefore described and consequently, the Q component of the demodulated color signal decreases. Therefore, correct normal fresh tone can be reproduced.

When a carrier chrominance signal of which color vector exists in one of the first, third and fourth quadrants, the matrix circuit 5 produces +(B—Y) or —(R—Y) signals. When +(B—Y) signal is produced, the diode 24 conducts, causing the base of the transistor 21 becomes positive and, therefore, the transistor 21 is non-conductive.

When —(R—Y) signal is produced, the diode 26 becomes non-conductive, the base of the transistor 22 becomes positive, the transistor 22 is non-conductive. Accordingly, at this time, the coil 17 is removed from the phase shift circuit 11 and the phases of the B—Y and R—Y sub-carriers coincide with the (B—Y) and (R—Y) axis, respectively. Consequetly, magenta, blue, cyan or/and green is reproduced without any modification so that a correct color can be reproduced.

In the fourth embodiment, a forward voltage of the diode 24 and a bias voltage being obtained by the resistor 23 can be compensate a voltage $V_{be}$ between the base and the emitter of the transistor 21, so that a switching level of the transistor 21 can be decided by connecting suitable number of diodes in series.

A similar operation can be performed by the circuit composed of the diode 26, resistor 25 and the transistor 22.

What is claimed is:

1. A hue control circuit for use in a color television system to reproduce a normal flesh tone, including means for reducing the Q component of a color signal, said means comprising a sub-carrier oscillator, a (B—Y) demodulator means for deriving a (B—Y) color difference signal from a carrier chrominance signal in accordance with the (B—Y) sub-carrier, an (R—Y) demodulator means for deriving an (R—Y) color difference signal from a carrier chrominance signal in accordance with the (R—Y) sub-carrier, matrix circuit means for receiving the outputs of said demodulator circuit means and deriving (B—Y), (R—Y) and (G—Y) signals therefrom, and a phase shifting circuit means coupled between the sub-carrier oscillator and both said demodulator means and said phase shifting circuit means being controlled by said (R—Y) output signal from said matrix circuit means, wherein the phase difference between demodulation axes (R—Y) and (B—Y) when the (R—Y) output signal is positive, is larger than 90°, such that the Q component is decreased to provide compensation for a normal flesh tone, and when said (R—Y) output signal is negative, is 90°, whereby said Q component is not decreased.

2. A hue control circuit for use in a color television system to reproduce a normal flesh tone, including means for reducing the Q component of the color signal, said means comprising a sub-carrier oscillator, a (B—Y) demodulator means for deriving a (B—Y) color difference signal from a carrier chrominance signal in accordance with the (B—Y) sub-carrier, a (R—Y) demodulator means for deriving a (R—Y) color difference signal from a carrier chrominance signal in accordance with the (R—Y) sub-carrier, matrix circuit means for receiving the outputs of said demodulator circuit means and deriving (B—Y), (R—Y) and (G—Y) signals therefrom, and a phase shifting circuit means coupled between the sub-carrier oscillator and both said demodulator means, said phase shifting circuit means being controlled by said (R—Y) and (B—Y) output signals from said matrix circuit, wherein the phase difference between demodulation axes (R—Y) and (B—Y) when the (R—Y) output signal is positive and the (B—Y) output signal is negative is larger than 90°, such that the Q component is decreased to provide comepensation for a normal flesh tone, and when said (R—Y) output signal is negative or said (B—Y) output signal is positive, is 90°, whereby said Q component is not decreased.

* * * * *